United States Patent
Kobayashi

(10) Patent No.: US 9,591,220 B2
(45) Date of Patent: Mar. 7, 2017

(54) SELECTION APPARATUS, SELECTION METHOD, AND STORAGE MEDIUM

(71) Applicant: CANON KABUSHIKI KAISHA, Tokyo (JP)

(72) Inventor: Masaaki Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 14/467,287

(22) Filed: Aug. 25, 2014

(65) Prior Publication Data
US 2015/0070517 A1 Mar. 12, 2015

(30) Foreign Application Priority Data

Sep. 6, 2013 (JP) ................................. 2013-185708

(51) Int. Cl.
*H04N 5/232* (2006.01)
*G06T 7/00* (2006.01)

(52) U.S. Cl.
CPC ....... *H04N 5/23254* (2013.01); *G06T 7/0004* (2013.01); *G06T 2207/10012* (2013.01); *G06T 2207/30168* (2013.01)

(58) Field of Classification Search
CPC .............. H04N 5/23254; G06T 7/0004; G06T 2207/10012; G06T 2207/30168; G06T 7/0079–7/0097
See application file for complete search history.

(56) References Cited

U.S. PATENT DOCUMENTS

| 6,130,965 | A | 10/2000 | Kobayashi et al. | |
|---|---|---|---|---|
| 8,792,727 | B2 | 7/2014 | Inaba et al. | |
| 2009/0169107 | A1* | 7/2009 | Chien | G06T 7/0028 382/190 |
| 2010/0296698 | A1* | 11/2010 | Lien | G06T 7/0081 382/103 |
| 2012/0162454 | A1* | 6/2012 | Park | H04N 5/23254 348/208.6 |
| 2012/0243011 | A1* | 9/2012 | Fukuda | H04N 1/6033 358/1.9 |
| 2012/0275711 | A1 | 11/2012 | Inaba et al. | |
| 2013/0307936 | A1* | 11/2013 | Kim | H04N 13/0239 348/47 |

FOREIGN PATENT DOCUMENTS

JP  2012-234258 A  11/2012

OTHER PUBLICATIONS

"Detection of Feature Points for Computer Vision," Journal of IEICE, 2004, vol. 87, No. 12, pp. 1043-1048.
Fujiyoshi et al., "Gradient-based Image Local Features," Journal of JSPE, 2011, vol. 77, No. 12, pp. 1109-1116.
(Continued)

*Primary Examiner* — Jason Flohre
(74) *Attorney, Agent, or Firm* — Fitzpatrick, Cella, Harper & Scinto

(57) ABSTRACT

A selection apparatus generates comparison information based on comparison between the pixel values of input pixels and a reference pixel value. The selection apparatus selects the output pixels from the input pixels based on the comparison information and feature amounts representing the features of the input pixels.

19 Claims, 9 Drawing Sheets

(56) References Cited

OTHER PUBLICATIONS

Shi et al., "Good Features to Track," IEEE Conference on Computer Vision and Pattern Recognition, Jun. 1994.
Tomasi et al., "Shape and Motion from Image Streams: A Factorization Method, Part 3, Detection and Tracking of Point Features," Apr. 1991, pp. 1-20.
Chabat et al., "A corner orientation detector," Image and Vision Computing 17 (1999) pp. 761-769.
Rosten et al., "Machine learning for high-speed corner detection," Department of Engineering, Cambridge University, {er258, twd20)}@cam.ac.uk, pp. 1-14.
Harris et al., "A Combined Corner and Edge Protector," Plessy Research Roke Manor, UK, The Plessy Company plc 1988, pp. 147-151.

* cited by examiner

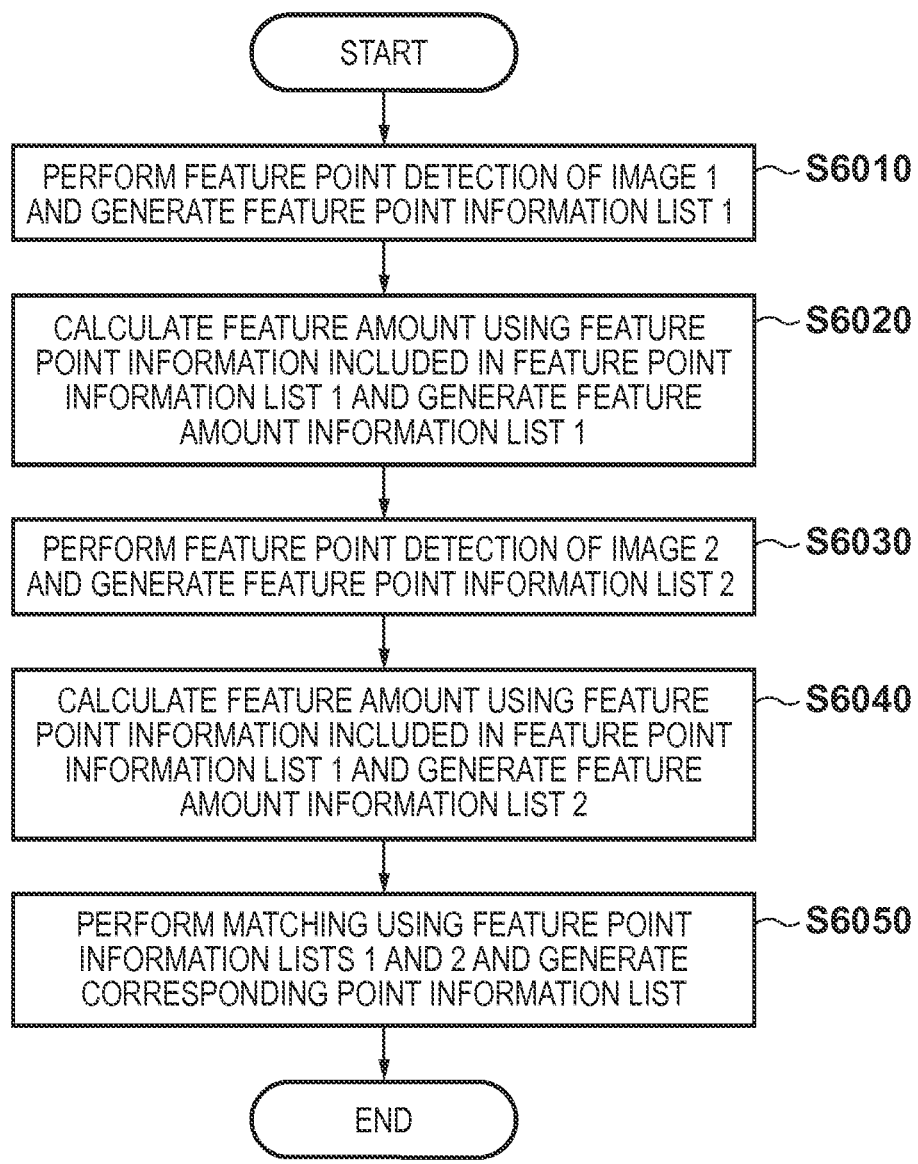

FIG. 7A

| ITEM NAME | X-COORDINATE OF FEATURE POINT | Y-COORDINATE OF FEATURE POINT | FEATURE POINT SCORE |
|---|---|---|---|
| TYPE AND SIZE | 16-BIT INTEGER WITHOUT SIGN | 16-BIT INTEGER WITHOUT SIGN | 16-BIT INTEGER WITHOUT SIGN |
| VARIABLE NAME | X | Y | S |

FIG. 7B

| ITEM NAME | X-COORDINATE OF FEATURE POINT | Y-COORDINATE OF FEATURE POINT | FEATURE POINT SCORE | LUMINANCE VALUE |
|---|---|---|---|---|
| TYPE AND SIZE | 16-BIT INTEGER WITHOUT SIGN | 16-BIT INTEGER WITHOUT SIGN | 16-BIT INTEGER WITHOUT SIGN | 8-BIT INTEGER WITHOUT SIGN |
| VARIABLE NAME | X | Y | S | V |

FIG. 7C

| ITEM NAME | X-COORDINATE OF FEATURE POINT | Y-COORDINATE OF FEATURE POINT | FEATURE AMOUNT |
|---|---|---|---|
| TYPE AND SIZE | 16-BIT INTEGER WITHOUT SIGN | 16-BIT INTEGER WITHOUT SIGN | 256 BITS |
| VARIABLE NAME | X | Y | BITS |

FIG. 7D

| ITEM NAME | X-COORDINATE OF FEATURE POINT OF IMAGE 1 | Y-COORDINATE OF FEATURE POINT OF IMAGE 1 | X-COORDINATE OF FEATURE POINT OF IMAGE 2 | Y-COORDINATE OF FEATURE POINT OF IMAGE 2 |
|---|---|---|---|---|
| TYPE AND SIZE | 16-BIT INTEGER WITHOUT SIGN | 16-BIT INTEGER WITHOUT SIGN | 16-BIT INTEGER WITHOUT SIGN | 16-BIT INTEGER WITHOUT SIGN |
| VARIABLE NAME | X1 | Y1 | X2 | Y2 |

SELECTION APPARATUS, SELECTION METHOD, AND STORAGE MEDIUM

BACKGROUND OF THE INVENTION

Field of the Invention

The present invention relates to a selection apparatus, selection method, and storage medium which select an output pixel from an input pixel forming an input image.

Description of the Related Art

In the field of computer vision, processing called feature point detection (or feature point extraction) is available. According to "Detection of Feature Points for Computer Vision" (Journal of IEICE, Vol. 87, No. 12, pp. 1043-1048, 2004) and "Gradient-based Image Local Features" (Journal of JSPE, Vol. 77, No. 12, pp. 1109-1116, 2011), various schemes such as the Harris operator scheme and the FAST scheme are available.

As an application of feature point detection, the motion of feature points is obtained from an image including the motion of camera shake is obtained to perform camera shake correction processing.

In addition, feature points are detected from a stereo image constituted by two, right and left images, and a three-dimensional image can be formed from relative positions of feature point pairs matching between images. In addition, feature point detection can also be applied to image search and image recognition.

US Patent Application Publication No. 2012/0275711 (A1) describes a method of setting a detection target count and narrowing down a feature point detection count to a target count in accordance with the reliabilities (to be referred to as feature scores hereinafter) of the detected feature points.

In the feature point detection method of narrowing down the feature point detection count to the target count in accordance with the feature point scores, when the feature points are narrowed down in a scan order to obtain equal feature point scores, matching performance in matching the feature points may degrade.

SUMMARY OF THE INVENTION

The present invention has been made in consideration of the above problem and enables selection of an output pixel from an input pixel by using, as an indicator, comparison information between a reference pixel value and the pixel value of the input pixel in addition to the feature amount of the input pixel.

According to the present invention, there is provided a selection apparatus for selecting output pixels from input pixels forming an input image, comprising: a comparison unit configured to output comparison information based on comparison between pixel values of the input pixels and a reference pixel value; and a selection unit configured to select the output pixels from the input pixels based on the comparison information and feature amounts representing features of the input pixels.

According to the present invention, there is also provided a selection method in a selection apparatus for selecting output pixels from input pixels forming an input image, comprising: generating comparison information based on comparison between the pixel values of the input pixels and the reference pixel value; and selecting the output pixels from the input pixels based on the comparison result and feature amounts representing features of the input pixels.

Further features of the present invention will become apparent from the following description of exemplary embodiments with reference to the attached drawings.

BRIEF DESCRIPTION OF THE DRAWINGS

FIG. 6 is a flowchart for explaining a corresponding point search method;

FIGS. 7A to 7D are tables for explaining data formats;

DESCRIPTION OF THE EMBODIMENTS

First, a method of feature point detection method of setting a target count for detecting a predetermined number of feature points and detecting feature points corresponding to the target count will be described. Next, the first embodiment of a corresponding point search method using this feature point detection method will be described. In this embodiment, a description will be made based on an assumption that a CPU in a PC executes the respective steps. However, the CPU in the PC need not execute the steps, but the steps may be executed in a smartphone or camera. Alternatively, some or all of the steps may be executed by dedicated hardware.

Figure 9A:
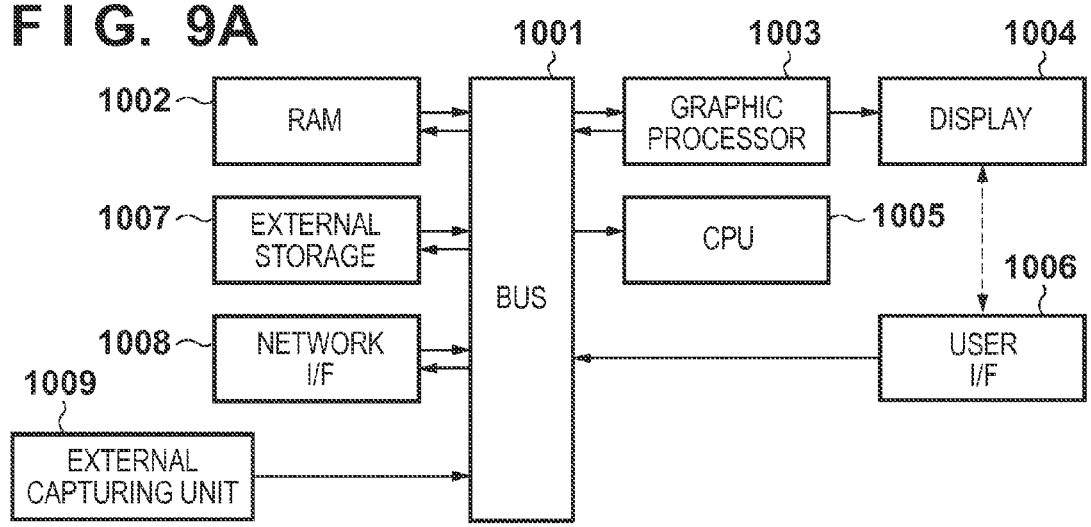
FIGS. 9A and 9B are block diagrams for explaining apparatus arrangements.

The arrangement of the PC and the operation of each module according to this embodiment will be described with reference to FIG. 9A. FIG. 9A is a block diagram for explaining the internal arrangement of the PC. In the PC according to this embodiment, a RAM 1002, a graphic processor 1003, a CPU 1005, a user I/F 1006, an external storage 1007, a network I/F 1008, and an eternal capturing unit 1009 are connected via a bus 1001. In this embodiment, the user I/F 1006 is a touch panel, but is not limited to this. The user I/F 1006 may be a mouse. The external storage 1007 is made of a nonvolatile memory, and the external capturing unit 1009 is made of a camera. According to this embodiment, a description will be made based on an assumption that the CPU executes control processing of each hardware unit. However, dedicated hardware may be added to execute processing in place of the CPU.

In this embodiment, programs to be executed and data are recorded in the external storage 1007, loaded in the RAM 1002, and executed and processed by the CPU 1005. The programs and data are input/output via the bus 1001. When inputting image data, the image data is read out from the external storage 1007, converted into an internal image format, and used, unless otherwise specified. In this embodiment, the internal image format indicates an 8-bit image made of only a luminance component. This image is corrected with display γ (γ=2.2). However, the image is not limited to this. For example, a 16-bit image can be handled.

A shooting condition such as exposure is added to image data as metadata. An image can be input from the external capturing unit 1009 and the network I/F 1008. A UI (User Interface) screen and a processing image result can be displayed on a display 1004 via the graphic processor 1003. The graphic processor 1003 can perform geometric conversion of an input image. The converted image can be stored in the RAM 1002 or directly output to the display 1004. The user I/F 1006 can accept a user input when the user touches a button displayed on the display 1004. The processed data can be stored in the external storage 1007 or the RAM 1002 and can be shared with other programs.

Figure 1:
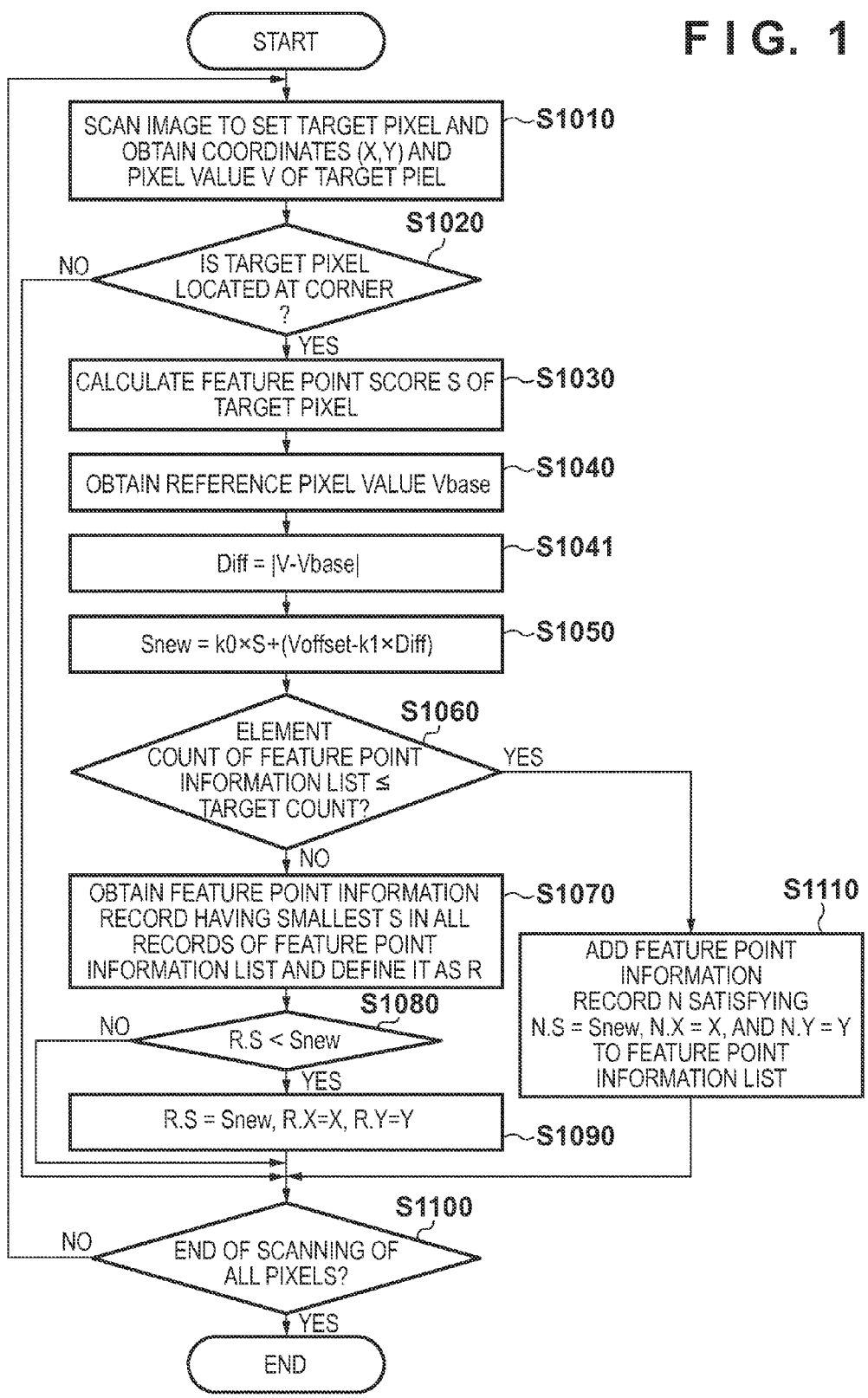
FIG. 1 is a flowchart for explaining a feature point detection method.

The practical operation sequence of a feature point detection method according to this embodiment will be described below with reference to FIG. 1. FIG. 1 is a flowchart for explaining the feature point detection method. According to this embodiment, a feature point detection target count is set for one image. After the feature point detection sequence shown in FIG. 1 ends, the feature point information of the set target count is stored in a feature point information list. Note that the feature point information is information about the detection result of one feature point.

The feature point information of this embodiment will be described with reference to FIG. 7A. FIG. 7A is a table for explaining the format of feature point information. According to this embodiment, the feature point information is made of an X-coordinate value, a Y-coordinate value, and a feature point score S. The feature point information is processed as a structure. According to this embodiment, when a structure variable is defined as P, variables which hold the X-coordinate value, Y-coordinate value, and feature point score S of the structure are represented as P.X, P.Y, and P.S, respectively. By using the period (.), a member variable of the structure can be accessed.

According to this embodiment, a description will be made based on an assumption that the feature point information is managed by the feature point information list. However, the present invention is not limited to this. The feature point information may be managed using a variable length array. In addition, according to this embodiment, the feature point information stored in the feature point information list is shared with a feature point calculation program and a matching program and processed.

Note that the respective steps are executed in an order of arrows in FIG. 1, unless otherwise specified. In addition, the order of steps is not limited to processing having no dependent relationship, and these steps can be executed in a different order.

Figure 8A:
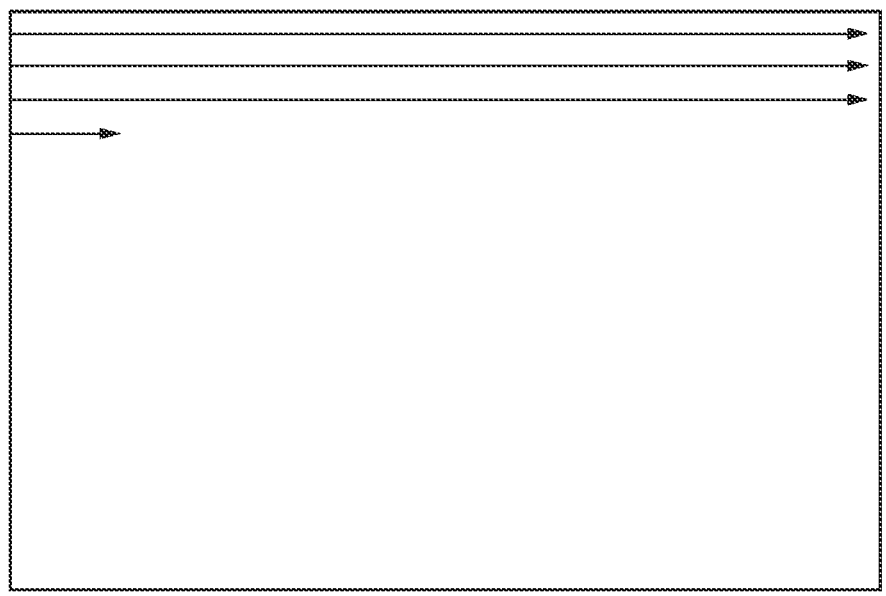
FIGS. 8A and 8B are views for explaining an example of scanning pixels.

In step S1010 of FIG. 1, the CPU 1005 scans an image to set a target pixel. The CPU 1005 obtains the X-coordinate value, Y-coordinate value, and pixel value (luminance value) of the target pixel and substitutes them into X, Y, and V, respectively. Every time processing in step S1010 is executed, the CPU 1005 sequentially sets target pixels in a scanning order shown in FIG. 8A. FIG. 8A explains the scanning order of pixels of an image. In the pixel scanning shown in FIG. 8A, pixels are scanned from the left to the right for each line of the image and scanned line by line vertically.

In step S1020, the CPU 1005 determines whether a pixel is located at a corner. If the CPU 1005 determines that a pixel is located at a corner, the process changes to step S1030; otherwise, the process changes to step S1100. In this embodiment, corner determination is performed using a FAST scheme. However, the corner determination scheme is not limited to a specific one.

In step S1030, the CPU 1005 calculates the feature point score S. The feature point score S is an evaluation value representing the feature of the target pixel. According to this embodiment, a value used for determination of non-extreme value suppression in the FAST scheme is used as the feature point score S. In this embodiment, in an 8-bit image, the feature point score S is a value expressed by 8 bits. In this embodiment, a description has been made based on an assumption that non-extreme value suppression is not performed. However, non-extreme value suppression may be performed. In addition, the scheme for calculating the feature point score S is not limited to the FAST scheme. For example, the feature point score S may be calculated using, for example, the Harris operator.

In step S1040, the CPU 1005 obtains a reference pixel value and substitutes it in Vbase. In this embodiment, since the 8-bit image is handled, 128 as the median in the luminance range of 0 to 255 is defined as the reference pixel value. In step S1041, the CPU 1005 compares the reference pixel value Vbase with a pixel value (luminance value) V, obtains the absolute value of their difference, and substitutes it in Diff as comparison information. Diff expresses a degree of closeness of the pixel value V with respect to the reference pixel value Vbase. That is, when Diff decreases, the pixel value V is closer to the reference pixel value Vbase.

In step S1050, the CPU 1005 calculates a 16-bit new score Snew by the following equation using the comparison information Diff obtained in step S1041 and the feature point score S calculated in step S1030:

$$Snew = k0 \times S + (Voffset - k1 \times Diff)$$

The above equation will be described in detail below. First of all, weights for designating the priorities of the comparison information Diff and the feature point score S are given as k0 and k1. In this embodiment, k0=256 and k1=1. An offset value for causing Snew not to take a negative value is given as Voffset. In this embodiment, since the comparison information Diff takes only an 8-bit value of 0 to 255, the new score Snew does not take a negative value, provided that the offset value Voffset is given as 255. Snew obtained by adding Voffset to a difference between the product obtained by multiplying S by k0 and the product obtained by multiplying Diff by k1 takes a larger value when the pixel value V is closer to the reference pixel value Vbase. Note that the contribution rates of the respective terms can be adjusted by changing the values of k0 and k1.

In step S1060, the CPU 1005 compares an element count representing feature points in the feature point information list (to be referred to as an element count simply) with the feature point detection target count of each image. If the element count is equal to or less than the target count, the process changes to step S1110; otherwise, the process changes to step S1070. In step S1110, the CPU 1005 substitutes N.S=Snew, N.X=X, and N.Y=Y into the structure variables N of the new structure and adds the structure N to the list. The element count of the feature point information list increases. X and Y are the X-coordinate value and Y-coordinate value, respectively, of the target pixel.

On the other hand, in steps S1070 to S1090, the CPU 1005 updates feature point scores in the already created feature point information list as processing executed when the element count of the feature point information list exceeds the target count.

First, in step S1070, the CPU 1005 searches all the structure variables N of the feature point information list for a structure variable whose feature point score S is the smallest. The CPU 1005 defines the found structure variable as a variable R. Note that R is handled as a reference variable, and to rewrite R is to rewrite the structure variable itself in the feature point information list. In step S1080, the CPU 1005 compares R.S with Snew. If R.S is smaller than Snew, the CPU 1005 executes processing in step S1090; otherwise, the process changes to step S1100. R.S represents the variable R which holds the smallest feature point score S in the feature point information list.

In step S1090, the CPU 1005 substitutes the new score Snew calculated in step S1050, and the X- and Y-coordinate values into the variables R.S, R.X, and R.Y, respectively. That is, in step S1090, the feature point information list is updated using a new score Snew having a value larger when the pixel value V is closer to the reference pixel value Vbase.

As described above, when the processing from step S1060 to step S1110 is executed, the feature point information of the target count stored in the feature point information list becomes feature point information having the new score Snew having a larger value out of the new scores Snew calculated in step S1050. More specifically, the feature point information list of pixels, out of all pixels included in one image, which are selected to have pixel values closer to the reference pixel value is generated.

The corresponding point search method using the above feature point detection method will be described with reference to FIG. 6.

FIG. 6 is a flowchart for explaining the corresponding point search method.

In step S6010, the CPU 1005 receives a first image (to be referred to as image 1 hereinafter) and executes the flowchart in FIG. 1 to generate a feature point information list. The generated feature point information list is defined as feature point information list 1.

In step S6020, the CPU 1005 calculates the feature amounts of all the feature points included in feature point information list 1, thereby generating a feature amount information list. This is defined as feature amount information list 1. In this embodiment, the feature amount is calculated using a 256-bit BRIEF scheme. The feature amount calculation scheme is not limited to a specific one. The feature amount may be calculated using the RIFF or SIFT scheme. The feature amount information list has a data structure in which feature amount information as information associated with the feature amount of one feature point is managed in a list form.

The feature amount information will be described with reference to FIG. 7C. FIG. 7C shows a feature amount information format. The feature amount information is made of an X-coordinate value, Y-coordinate value, and 256-bit feature amount bit data of the feature point. The feature amount information format is not limited to this. For example, the feature amount information format may have a form which has an address to refer to not coordinate information but feature point information and obtain coordinate information by referring to the address. In this embodiment, feature amount information is managed in a list. The management method is not limited to this. The feature amount information may be managed using, for example, a variable length array.

In step S6030, the CPU 1005 receives a second image (to be referred to as image 2 hereinafter) different from the first image and executes the flowchart in FIG. 1 to generate a feature point information list. The first image and the second image are two frame images consecutive in a moving image. The generated feature point information list is defined as feature point information list 2. In step S6040, the CPU 1005 calculates the feature amounts of all the feature points included in feature point information list 2, thereby generating a feature amount information list. This is defined as feature amount information list 2.

In step S6050, the CPU 1005 performs matching using the feature amount bit data included in feature amount information list 1 and feature amount information list 2, thereby generating a corresponding point information list. In this step, CPU 1005 calculates the Hamming distances of all combinations of the feature amount bit data of the two lists and generates a feature point pair between feature points having a shortest Hamming distance. The corresponding point information list has a data structure which manages the corresponding point information expressing one feature point pair in a list format.

When the first image and the second image are consecutive, the relative position of the feature point pair is regarded as the moving amount of the feature point. The motion of an object or entire image including the feature point can be obtained from the moving amount. For example, when the motion by camera shake is contained in an image, geometric conversion is performed to correct the moving amount of the entire image to achieve processing for correcting camera shake.

When a feature point is detected from a stereoscopic image formed by two, right and left images, the depth of the feature point can be estimated using the principle of triangulation from the relative position of the feature point pair having undergone matching between the two images. That is, a three-dimensional image can be formed from the stereoscopic image.

The corresponding point information will be described below with reference to FIG. 7D. FIG. 7D is a table for explaining a corresponding point information format. The corresponding point information is made of X- and Y-coordinate values of a feature point of image 1 and X- and Y-coordinate values of a feature point of image 2 out of the matched feature point pair. Note that in this embodiment, the corresponding point information is managed in a list. However, the present invention is not limited to this. The corresponding point information may be managed using a variable length array. The generated corresponding point information list is shared with other programs and used for, for example, camera shake correction and three-dimensional image formation.

The difference between the conventional feature point detection and the feature point detection of this embodiment will be described below. Conventionally, the CPU 1005 did not compare the reference pixel value Vbase with the pixel value V. In this case, the CPU 1005 performs determination in step S1080 and score updating in step S1090 directly using the feature point score S in place of the new score Snew. That is, pixels having the same score are selected in the processing order. In other words, when the pixels have the same score, the determination in step S1080 becomes NO, and the feature point information list is not updated in step S1090.

As shown in FIG. 8A, in general image processing, pixels are scanned from the left to the right for each line of an image and scanned line by line vertically. This also applies to the feature point detection. For this reason, when the reference pixel value Vbase is not compared with the pixel value V, a feature point in the upper portion of the image tends to be selected, and feature point selection is based on positional dependence. Therefore, it is hard to uniformly select feature points from the entire screen.

In particular, when a scheme for calculating a score in a simple addition/subtraction or an absolute value calculation, e.g. the FAST scheme, is applied to an 8-bit image, the score values are calculated in the range (8 bits) of 0 to 255. This calculation tends to result in a low resolution and obtain identical scores as compared with a case in which a Harris operator is calculated with the 32-bit floating point. The tendency of positional dependence becomes strong.

On the other hand, according to this embodiment, the CPU 1005 compares the pixel value V with the reference pixel value Vbase and calculates the new score Snew using the comparison information Diff as a result of comparison and the feature point score S multiplied by k0 (for example, 256 times). The determination in step S1080 and the score updating in step S1090 are performed based on the calculated new score Snew. In addition, according to this embodiment, since the new score Snew takes a 16-bit value, the score values can hardly be identical values probabilistically compared with the 8-bit values as the FAST scores. The scanning order dependence of feature points lowers, and feature points can be easily obtained uniformly from the entire screen.

In addition, to match the positions of two images, it is important to perform matching without omitting identical feature points existing in the respective images. According to this embodiment, the CPU 1005 stores, in the feature point information list, a new score Snew which increases when the luminance is close to the reference pixel value Vbase. In other words, the CPU 1005 preferentially selects a feature point having a luminance close to the reference pixel value Vbase. This makes it possible to advantageously increase a probability for leaving identical feature points between two images and as a result increase the probability of matching success. This advantage is effective even when the score value is expressed with the floating point. Therefore, this embodiment can obtain an effect when it is applied to a feature point detection scheme other than the FAST scheme.

This embodiment has been described such that feature points having larger score values are preferentially selected. There is also available a score value calculation method in which as a value is smaller, the feature degree of a feature point is large. In this case, an arrangement for preferentially selecting a feature point having a smaller score value may be adapted to obtain a small-value priority new score Snew':

$$Snew'=k0'\times S'+k1'\times Diff$$

where S' is a score by which the feature degree of a feature point is larger when the value is smaller, and k0' and k1' are coefficients for determining the score and the contribution rate of Diff.

As described above, according to this embodiment, the feature point having a pixel value close to the reference pixel value is preferentially selected to lower the dependence on the scanning order in feature point selection. The matching performance for matching feature points extracted from a plurality of images can be improved.

Figure 2:
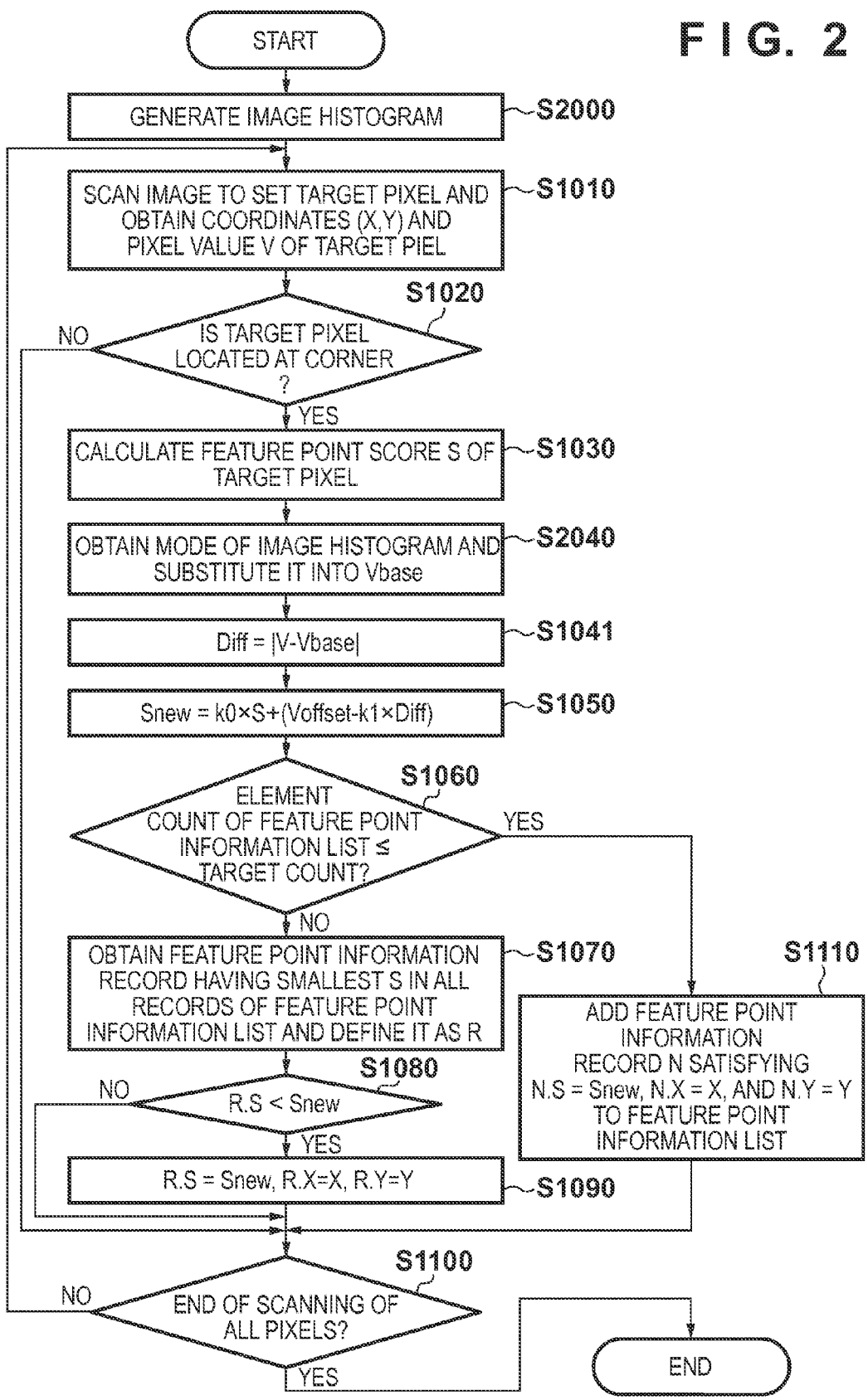
FIG. 2 is a flowchart for explaining a feature point detection method.

A feature point detection method according to the second embodiment will be described with reference to FIG. 2. The operation of the second embodiment will comply with the operation of the first embodiment, unless otherwise specified. FIG. 2 is a flowchart for explaining the feature point detection method according to the second embodiment. The flowchart in FIG. 2 is different from that of FIG. 1 in that step S2000 is added, and step S2040 is replaced with step S1040. The added and changed steps will be described below.

In step S2000, a CPU 1005 generates an image histogram expressing the luminance distribution of an image.

In step S2040, the CPU 1005 obtains a pixel value having a highest appearance frequency (this pixel value will be referred to as a mode hereinafter) as a result of analysis from the generated image histogram. The CPU 1005 substitutes the mode as the reference pixel value into Vbase.

More specifically, according to this embodiment, the CPU 1005 analyzes the image histogram to obtain the mode as the statistical indicator value of the image histogram and defines the mode as the reference pixel value. This reference pixel value is a value indicating the characteristics of an image. In narrow-down processing for narrowing down a feature point count into a target count, a pixel having a pixel value close to the statistical indicator value is preferentially selected and left in addition to the conventional feature point score. This makes it possible to readily select a pixel having a pixel value which exists in an image at a high probability. This also leads to the improvement of the matching performance.

According to this embodiment, every time a feature point information list is created, the CPU 1005 analyzes the image histogram and determines an optimal reference pixel value using the statistical amount of the analysis result. When the mode of the histogram of an image having a high appearance frequency is about 150, a pixel having a pixel value of about 150 is preferentially selected. When the mode of the histogram of an image having a low appearance frequency is about 100, a pixel having a pixel value of about 100 is preferentially selected. This means that feature points contained in a single object are selected at a high probability.

As described above, according to this embodiment, use of the statistical analysis result of the image histogram allows appropriate feature point detection in accordance with the appearance frequency of the image. Note that in this embodiment, the mode of the image histogram is used for calculating the reference pixel value. However, the present invention is not limited to this. A statistical indicator value such as an average value or median may be used in place of the mode. Alternatively, main component analysis may be performed, and a statistical indicator value calculated from the histogram of the main component may be used. In an arrangement in which images are continuously input and processed, when an abrupt change in appearance frequency does not occur between images, the statistical indicator values of a preceding frame or the moving average of the statistical indicator values of past neighboring frames may be used as the reference pixel value. With this arrangement, the statistical processing result and the feature point detection result of a single image do not have any dependence relationship. The processes can be performed parallel, and the processing time can be shortened.

Note that a reference pixel value Vbase is not limited to one value, and Diff can be calculated as below.

$$Diff=\min(|V-Vbase1|,|V-Vbase2|)$$

In this equation, Diff is the lower of the absolute values of the differences between pixel values and reference pixels. When a histogram has a bimodality in which a highlight area and a shadow part are sharply divided, two peak values are set to Vbase1 and Vbase2 respectively. This makes it possible to detect properly a feature point with high-luminance from the highlight area and a feature point with low-luminance from the shadow part, respectively.

Figure 8B:
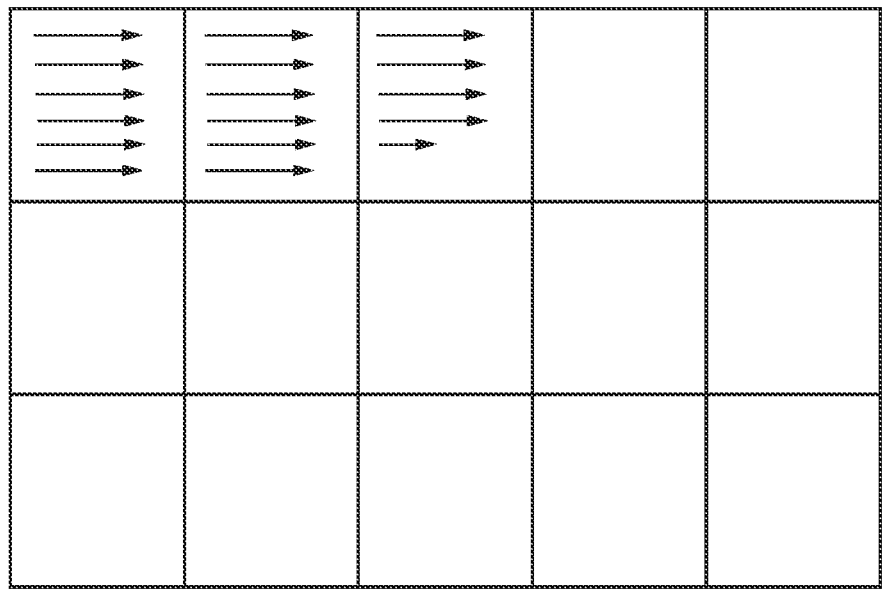

As a target image of this algorithm, an input image may be divided, and processing is performed for each region divided image unit, as shown in FIG. 8B. FIG. 8B shows image division and a pixel scanning example for each divided image unit. A histogram is analyzed for each region divided image unit, and a feature point target count is set for each region divided image unit. The pixels are scanned in the region to perform feature point detection processing, as shown in FIG. 8B. By performing region division as described above, an optical reference pixel value can be set for each region divided image unit to detect a feature point. Note that the scanning order shown in FIG. 8B can be applied to any embodiment.

Figure 3:
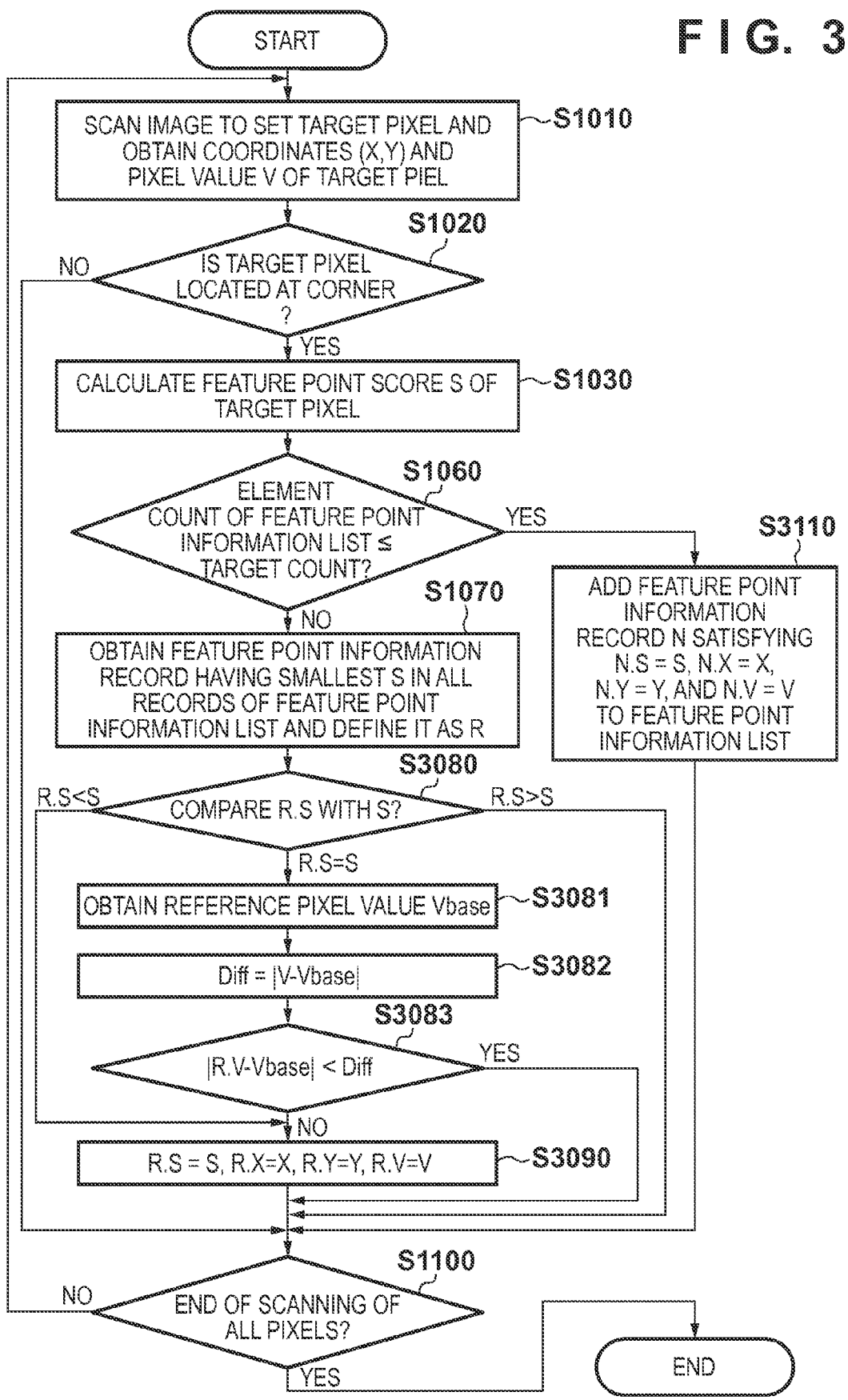
FIG. 3 is a flowchart for explaining a feature point detection method.

A feature point detection method according to the third embodiment will be described with reference to FIG. 3. The operation of the third embodiment complies with that of the first embodiment, unless otherwise specified. FIG. 3 is a flowchart for explaining the feature point detection method according to the third embodiment. The flowchart in FIG. 3 is different from that in FIG. 1 in that steps S1040, S1041, and S1050 are omitted, and steps S3081, S3082, and S3083 are added. Steps S1080, S1090, and S1100 are replaced with steps S3080, S3090, and S3110, respectively. The added and changed steps will be described below.

Feature point information according to the third embodiment will be described with reference to FIG. 7B. FIG. 7B is a table for explaining a feature point information format according to the third embodiment. A structure according to this embodiment is obtained by adding a member variable field for storing a pixel value V in addition to the structure described with reference to FIG. 7A. According to this embodiment, when the structure variable is given as P, information is accessed in the form of P.V.

Referring to FIG. 3, in step S3080, a CPU 1005 compares R.S with S. If R.S>S, the process changes to step S1100. If R.S=S, the process changes to step S3081. If R.S<S, the process changes to step S3090. In step S3081, a reference pixel value Vbase is obtained. In this embodiment, Vbase is 128 as in the first embodiment. In step S3082, the CPU 1005 calculates an absolute value Diff of a difference between the reference pixel value Vbase and a pixel value V.

In step S3083, the CPU 1005 calculates an absolute value |R.V−Vbase| of the difference between the reference pixel value Vbase and the pixel value (luminance value) R.V of a pixel having the smallest feature point score in the feature point information list. The CPU 1005 determines whether |R.V−Vbase|<Diff. If the determination result is true, the process changes to step S1100. If the determination result is false, the process changes to step S3090. In step S3090, the CPU 1005 substitutes R.S, R.X, R.Y, and R.V into S, X, Y, and V, respectively. That is, when the feature point score S of a pixel having the smallest feature point score S in the feature point information list is equal to the feature point score S of the target pixel, the CPU 1005 preferentially stores a feature point having a luminance close to the reference pixel value Vbase in the feature point information list.

In step S3110, the CPU 1005 substitutes N.S=S, N.X=X, N.Y=Y, and N.V=V in new structure variables N and adds the structure N into the list.

In this embodiment, even if the feature point score S of the current pixel is equal to the minimum value R.S of the feature point score stored in the list, condition determination using the result Diff as the result of comparison between the pixel value V and the reference pixel value Vbase is performed in step S3082, thereby updating the feature point information list. Therefore, narrowing-down based on less positional dependence can be practiced.

As described above, according to this embodiment, even if the feature point scores are the same, one of the feature point scores can be selected to detect a feature point based on the difference between the pixel value and the reference pixel value. In addition, Snew is not calculated to reduce the calculation amount, unlike the first embodiment.

Figure 4:
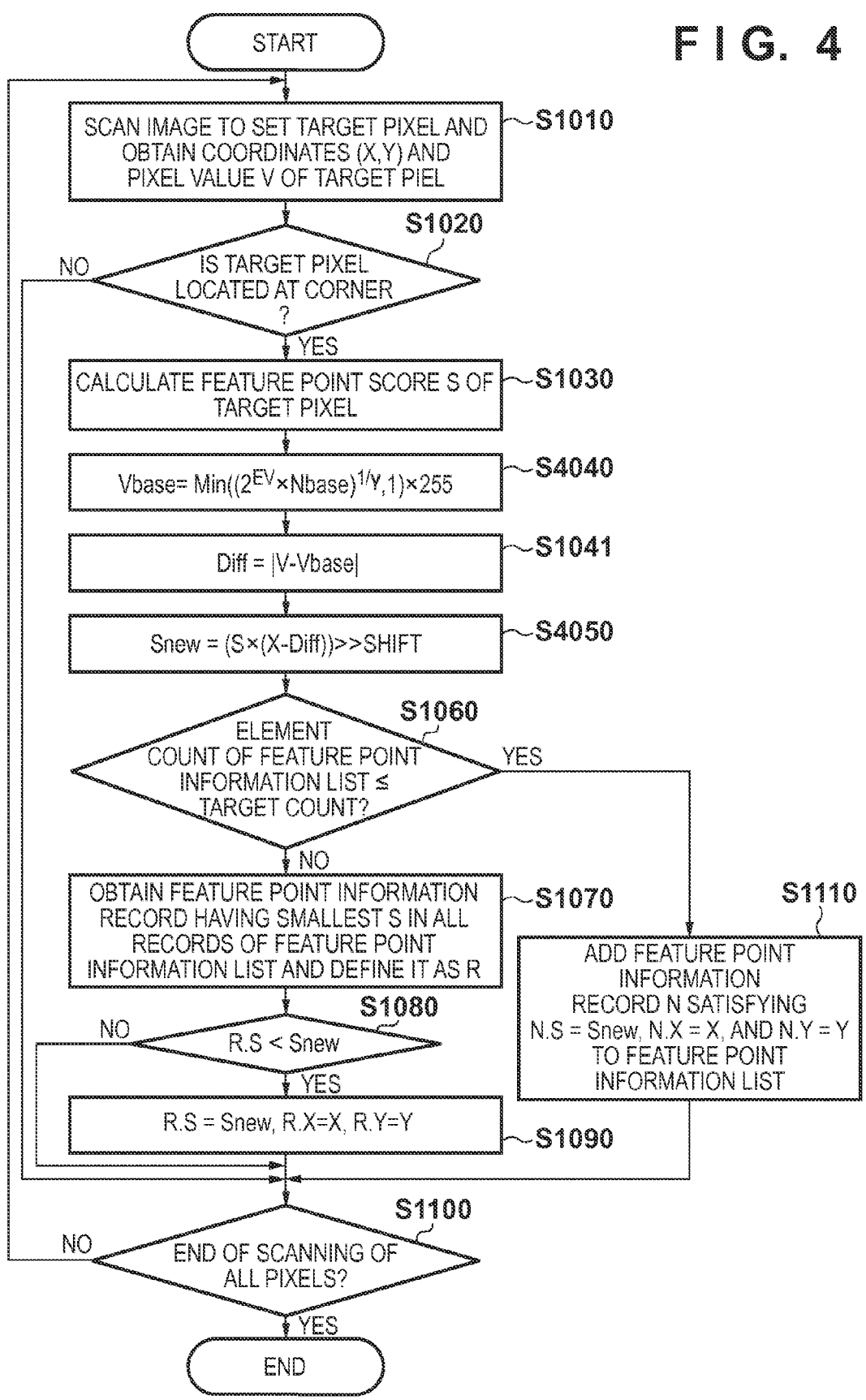
FIG. 4 is a flowchart for explaining a feature point detection method.

A feature point detection method according to the fourth embodiment will be described with reference to FIG. 4. The operation of the fourth embodiment complies with that of the first embodiment, unless otherwise specified. FIG. 4 is a flowchart for explaining the feature point detection method according to the fourth embodiment. The flowchart in FIG. 4 is different from that in FIG. 1 in that steps S1040 and S1050 are replaced with steps S4040 and S4050, respectively. The changed steps will be described below.

In step S4040, a CPU 1005 calculates a reference pixel value Vbase based on an exposure value EV set in an external capturing unit 1009:

$$Vbase = \mathrm{Min}((2^{EV} \times Nbase)^{(1/\gamma)}, 1) \times 255$$

where ^ represents the power and Min(a,b) is a function of returning a smaller one of values a and b. In this embodiment, the exposure value EV exists as metadata in image data, and the CPU 1005 obtains its data. Nbase is a median in the luminance range. In this embodiment, the luminance range is expressed from 0 to 1.0. The value of Nbase is defined as 0.5 as the median. The γ value is corrected with display γ (γ=2.2) and is defined as 2.2. Note that the values and mathematical expressions of Nbase and display γ are not limited to specific ones. The values and mathematical expressions may be changed to optimal ones depending on the system configuration.

In step S4050, the CPU 1005 calculates a 16-bit new score Snew by the following equation using the feature point score S and the absolute value Diff of the difference between the pixel value and the reference pixel value Vbase:

$$Snew = (S \times (X - \mathrm{Diff})) >> SHIFT$$

This equation will be described in detail below. X and SHIFT are constants. In this embodiment, X=1024 and SHIFT=2. >> represents the right shift calculation. A>>B indicates that A is shifted to the right by B bits. Since S has 8 bits, and X has 10 bits, Snew has 16 bits. The multiplier of S increases when the pixel value V is closer to the reference pixel value Vbase. That is, Snew increases. The resolution of the score value also increases from 8 bits as the S value to 16 bits. This makes it possible to obtain the same effect as in the first embodiment. By increasing/decreasing X, the contribution rate of the term |V−Vbase| in the Snew calculation can be adjusted.

As described above, according to this embodiment, the reference pixel value can be calculated using the exposure value EV to obtain the result considering the average luminance difference between the images.

A feature point detection method according to the fifth embodiment will be described with reference to FIG. 5. An internal image format to be handled in the feature point detection of this embodiment is given by an 8-bit image formed from dot sequential RGB components. The internal image format is not limited to a specific one. For example, different bit widths may be used or a frame sequential image may be used in place of a dot sequential image. The operation of this embodiment complies with that of the first embodiment, unless otherwise specified.

Figure 5:
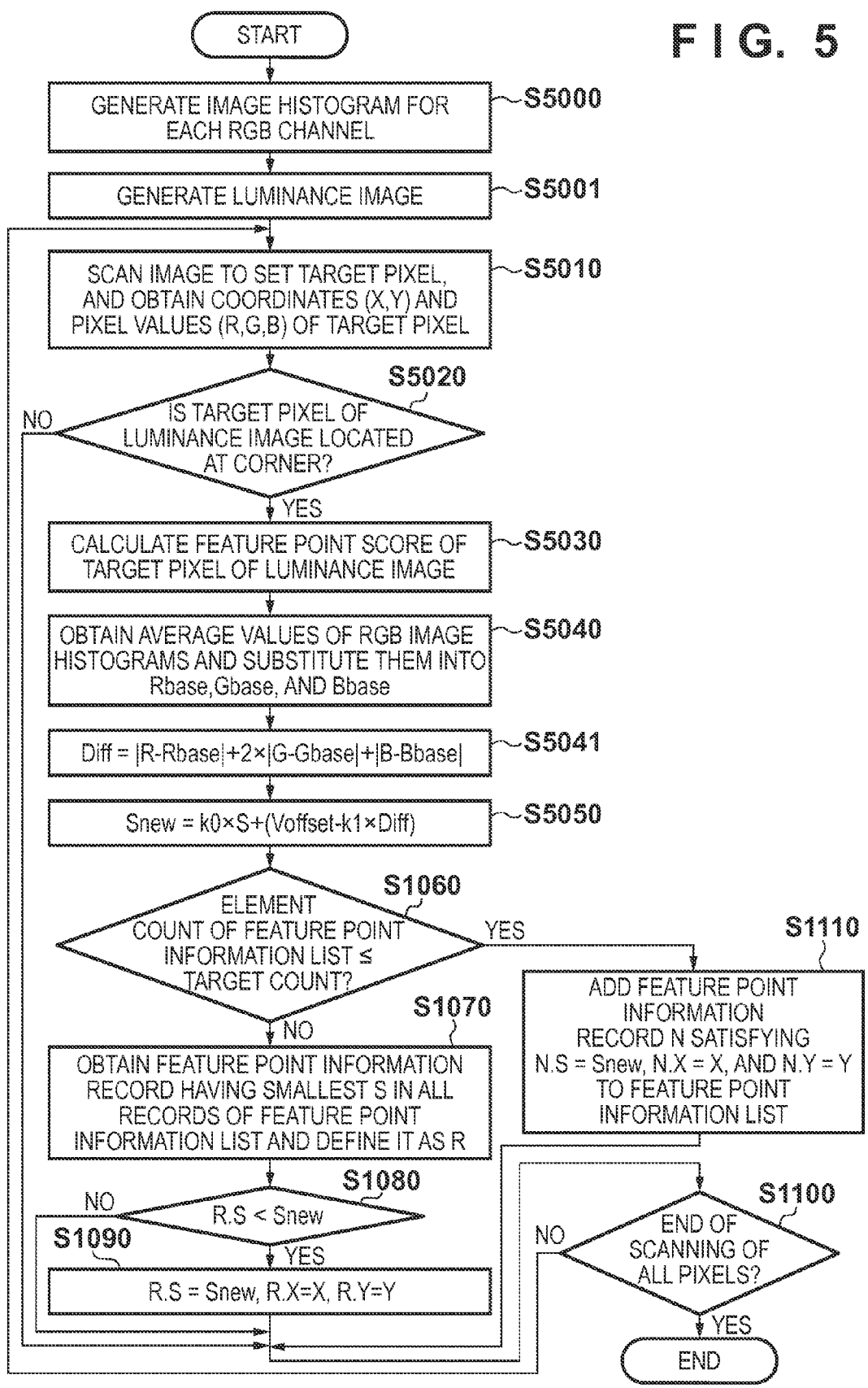
FIG. 5 is a flowchart for explaining a feature point detection method.

FIG. 5 is a flowchart for explaining the feature point detection method according to the fifth embodiment. The flowchart of this embodiment is different from that in FIG. 1 in that steps S1010 to S1050 are replaced with steps S5010 to S5050, and steps S5000 and S5001 are added. The target pixel and reference pixel value are handled as three-dimensional vector data which express RGB components. The added and changed steps will be described below.

In step S5000, a CPU 1005 generates image histograms for the respective RGB images. In step S5001, the CPU 1005 scans pixels of an image, calculates the pixel values from the RGB values, and generates the luminance image from the calculated pixel values. In this embodiment, since an image used for feature point detection is not used for an audiovisual purpose. A simple luminance calculation may be used. For example, a pixel value L can be calculated by:

$$L=R+2\times G+B$$

For example, the pixel value can be calculated by:

$$L=0.299\times R+0.587\times G+0.114\times B$$

When the luminance image has been generated in advance in another processing, this step is unnecessary.

In step S5010, the CPU 1005 scans an image to set a target pixel to obtain the X-coordinate value, Y-coordinate value, and R, G, and B values of the target pixel. The CPU 1005 substitutes the calculated values in X, Y, R, G, and B. As in step S1010 of FIG. 1, the CPU 1005 executes this step by sequentially changing the target pixel.

As in FIG. 1, in step S5020, the CPU 1005 determines whether the target pixel of the luminance image is located at a corner. If the target pixel is determined to be located at the corner, the CPU 1005 calculates a feature point score S of the target pixel of the luminance image in step S5030.

In step S5040, the CPU 1005 obtains the reference values of R, G, and B from the image histograms of the RGB images and substitutes them into Rbase, Gbase, and Bbase, respectively. In this embodiment, the reference values are modes of the RGB histograms, respectively. Average values may be used in place of the modes. In step S5041, the CPU 1005 calculates the absolute values of the differences of Br, Bg, and Bb using R, G, and B as the pixel values and the reference image values. The CPU 1005 then calculates a weighted average Diff:

$$\text{Diff}=|R-R\text{base}|+2\times|G-G\text{base}|+|B-B\text{base}|$$

Note that in this embodiment, the comparison information Diff is defined as the weighted average of the absolute values of the differences. However, the comparison information Diff is not limited to this. For example, the comparison information Diff may be given using square errors:

$$\text{Diff}=(R-R\text{base})^2+(G-G\text{base})^2+(B-B\text{base})^2$$

In step S5050, the CPU 1005 calculates a new score using the weighted average Diff of the absolute values of the differences and the feature point score S:

$$S\text{new}=k0\times S+(V\text{offset}-k1\times\text{Diff})$$

The equation used in step S5050 will be described below. k0 and k1 are weights for designating the priorities of the feature point score S and the comparison information Diff. In this embodiment, k0=1024 and k1=1. Voffset is the offset value for preventing Snew from taking a negative value. In this embodiment, when Voffset is 1023, Snew does not take a negative value. The processing from step S1060 is the same as in FIG. 1.

According to this embodiment, pixel value comparison is performed independently for R, G, and B serving as the vector elements of a multidimensional vector data. This makes it possible to identify and select pixels having different RGB balances but having identical pixel values probabilistically in narrowing-down processing. As described above, since matching is performed using the detected feature points, the matching performance can be improved.

An example of processing in an apparatus other than a PC will be described as the sixth embodiment. This embodiment will exemplify a camera apparatus having a feature point detection function and a corresponding point search function. The operation and arrangement of this embodiment complies with those of the first embodiment, unless otherwise specified.

Figure 9B:
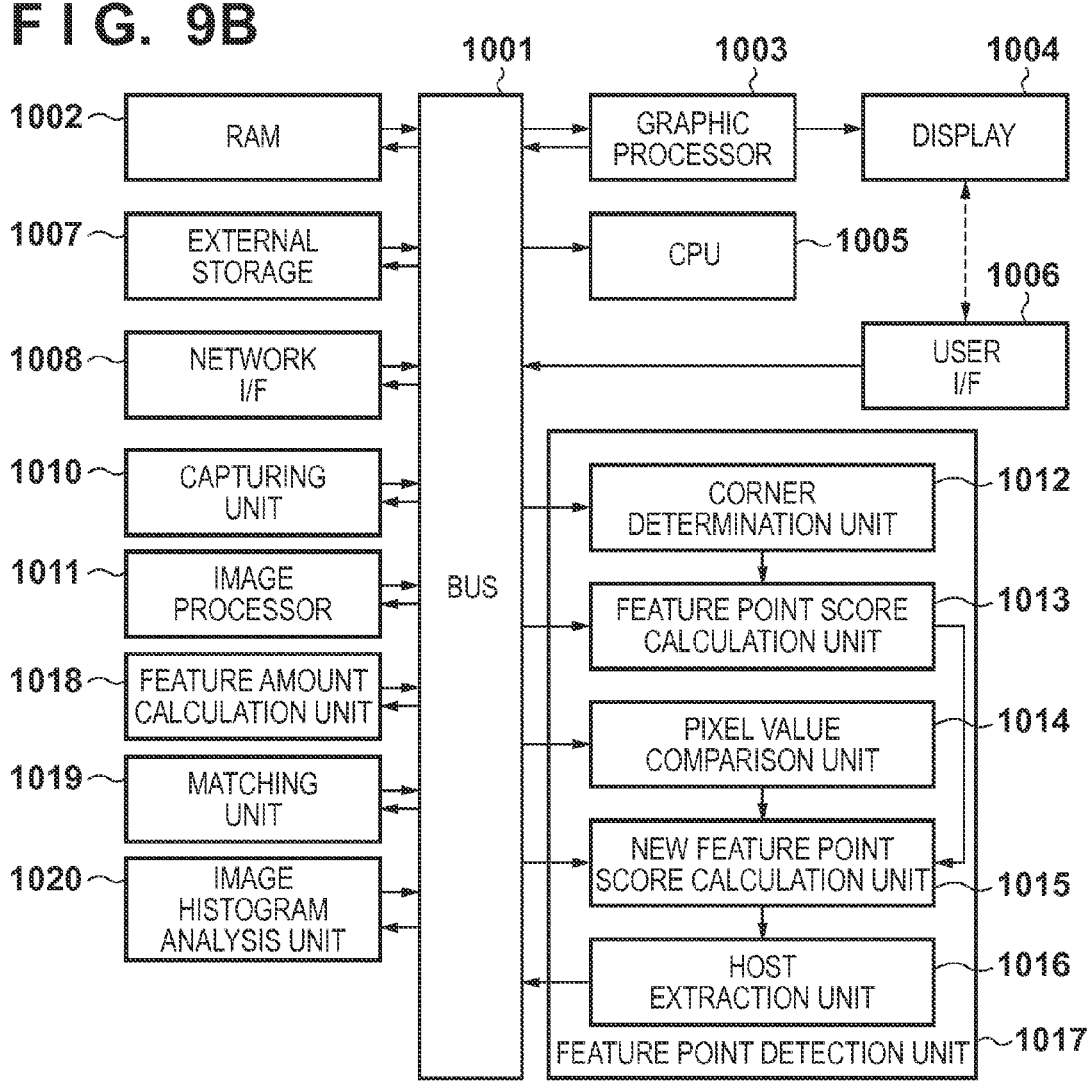

FIG. 9B is a block diagram for explaining the arrangement of the camera apparatus. The arrangement and operation of the camera apparatus in FIG. 9B are almost identical to those of FIG. 9A. However, a capturing unit 1010 is added in FIG. 9B in place of the external capturing unit 1009 in FIG. 9A. The arrangement in FIG. 9B is different from that in FIG. 9A in that an image processor 1011, a feature point detection unit 1017, a feature amount calculation unit 1018, a matching unit 1019, and an image histogram analysis unit 1020 are added. The feature point detection unit 1017 further includes a corner determination unit 1012, a feature point score calculation unit 1013, a pixel value comparison unit 1014, a new feature point score calculation unit 1015, and a host extraction unit 1016. The operation of the apparatus according to this embodiment will be described in detail below.

A user I/F 1006 is a touch panel and can set shooting conditions such as an f-number, shutter speed, and exposure value by allowing the user to touch buttons displayed on a display 1004. The shooting conditions are stored in a RAM 1002 and at the same time output to the capturing unit 1010. Note that the user I/F 1006 is not limited to the touch panel, but can be a physical dial or button.

The capturing unit 1010 is a capturing unit including an optical system, a sensor, and a circuit for converting a sensor image into a digital image. Capturing processing is performed in accordance with the shooting conditions set by the user I/F 1006. An image captured by the capturing unit 1010 is stored in the RAM 1002. The image processor 1011 converts the captured image into an internal format and stores it in the RAM 1002. According to this embodiment, an 8-bit luminance image is defined as the internal format. The internal format is not limited to a specific one. For example, an RGB image described in the fifth embodiment may be used.

The feature point detection unit 1017 detects a feature point from an 8-bit luminance image and stores information of the detected feature point as a feature point information array in the RAM 1002. The feature point information has the same data format as described in the first embodiment and has a data structure in which the feature point information array handles feature point information as an array. The internal arrangement of the feature point detection unit will be described later.

The feature amount calculation unit 1018 calculates the feature amount of each feature point by referring to the feature point information of the feature point information array and stores the calculated feature amount as a feature amount information array in the RAM 1002. The feature amount calculation of this embodiment is performed by the BRIEF scheme as in steps S6020 and S6040 in FIG. 6. However, the feature amount calculation scheme is not limited to this, and another feature amount calculation scheme can be used. The feature amount information has the same data format as described in the first embodiment. The feature amount information array has a data structure in which a plurality of pieces of feature amount information are handled as an array.

The matching unit 1019 performs matching of feature points by referring to the feature amount information array. The matching unit 1019 then stores the corresponding relationship between the matched points as a corresponding point information array in the RAM 1002. The matching method of this embodiment is equivalent to the scheme (step S6050 in FIG. 6) described in the first embodiment. The corresponding point information also has the same data format as in the first embodiment. The corresponding point information array has a data structure in which a plurality of pieces of corresponding point information are handled as an array. The image histogram analysis unit 1020 analyzes the image histogram and calculates a statistical amount such as an average value, mode, or median.

The internal arrangement and operation of the feature point detection unit 1017 will be described below. In the internal operation, pixels scanned as shown in FIG. 8A are processed for each pixel. In the following description, a processing pixel during scanning is expressed as a target pixel.

The corner determination unit 1012 determines whether the target pixel is located at a corner. If the determination in true, the units 1013 to 1016 are operated. In this embodiment, the FAST scheme is used for the corner determination as in step S1020 in FIG. 1. However, the corner determination is not limited to a specific scheme. The feature point score calculation unit 1013 calculates the feature point score S by referring to the target pixel and its neighboring pixels. The feature point score S is output to the unit 1015. In this embodiment, the value used by the FAST scheme for the non-extreme value suppression determination is the feature point score as in step S1030 of FIG. 1, but is not limited to this.

The pixel value comparison unit 1014 receives a reference pixel value Vbase and a pixel value V of the target pixel, calculates an absolute value |V−Vbase| of the difference between the two values, and outputs the absolute value to the unit 1015. Upon receiving an exposure value EV set in a user I/F 1006, the reference pixel value Vbase is calculated and set by:

$$Vbase = Min((2^{EV} \times Nbase)^{(1/\gamma)}, 1) \times 255$$

This equation is the same as in the fourth embodiment (step S4040 in FIG. 4). Nbase=0.5 and γ=2.2. Min(a,b) is a function of returning a smaller one of the values a and b. The calculated absolute value |V−Vbase| of the difference is output to the new feature point score calculation unit 1015.

The new feature point score calculation unit 1015 receives the absolute value Diff of the difference and the feature point score S and calculates a new score Snew. The method of calculating the new score is the same as described in the first embodiment (S1050 in FIG. 1). The new score Snew is output to the host extraction unit 1016.

The host extraction unit 1016 receives the new score Snew and searches the feature point information array for feature point information having the smallest feature point score. The feature point information array stores information of the feature point detected by the feature point detection unit 1017. The feature point information includes the X-coordinate value, Y-coordinate value, and feature point score S of the feature point. When the smallest feature point score is smaller than the new score Snew, the host extraction unit 1016 replaces the feature point information of the smallest feature point score with the feature point information including the new score Snew and the coordinate value of the pixel corresponding to the new score Snew. Note that the feature point information array may always exist in the RAM 1002, or the host extraction unit 1016 may include an internal RAM and output information to the RAM 1002 at the end of processing of one image.

This embodiment can have the same effect as in the first embodiment as a camera system. In addition, when the automatic exposure correction function in a general camera is used, the exposure value changes for each image. When the reference pixel value is fixed, it is undesirably difficult to select the corresponding feature points between images having different exposure values. In this embodiment, since the exposure value set at the time of capturing is used to calculate the reference pixel value, the corresponding feature points between the images can be easily selected. This makes it possible to improve the matching performance. In this embodiment, the exposure information is obtained to calculate the reference pixel value. The present invention is not limited to this. An apparatus including the image histogram analysis unit 1020 to calculate, as the reference pixel value, the statistical amount calculated by the image histogram analysis unit 1020 as in the second embodiment. In addition, the sixth embodiment may implement a camera apparatus capable of performing processing described in the third to fifth embodiments.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-185708, filed Sep. 6, 2013, which is hereby incorporated by reference herein in its entirety.

What is claimed is:

1. A selection apparatus for selecting output pixels from input pixels forming an input image, comprising:
a memory; and
a processor operatively coupled to the memory, functioning as:
a determination unit configured to determine priorities of the input pixels based on feature amounts representing features of the input pixels and on differences between pixel values of the input pixels and a reference pixel value, wherein said determination unit gives a higher priority to an input pixel having a smaller difference from the reference pixel value; and
a selection unit configured to select the output pixels from the input pixels based on the priorities determined by said determination unit.

2. The apparatus according to claim 1, wherein said selection unit selects a predetermined number of output pixels from the input pixels based on the priorities.

3. An apparatus for selecting output pixels from input pixels forming an input image, comprising:
- a memory; and
- a processor operatively coupled to the memory, functioning as:
- an obtaining unit configured to obtain evaluation values of input pixels having a bit length longer than feature amounts representing features of the input pixels, based on pixel values of the input pixels and the feature amounts of the input pixels; and
- a selection unit configured to select the output pixels from the input pixels based on the evaluation values of the input pixels having bit lengths longer than the feature amounts representing features of the input pixels.

4. The apparatus according to claim 1, wherein said selection unit selects the output pixels having a smaller difference from the reference pixel value than the input pixels with a same feature amount.

5. The apparatus according to claim 1, wherein said determination unit determines the priorities of the input pixels based on weighting calculation results between the feature amounts of the input pixels and the differences between the pixel values and the reference pixel value.

6. The apparatus according to claim 1, further comprising a matching unit configured to match a plurality of input images based on output pixels selected from input pixels forming the plurality of input images.

7. The apparatus according to claim 1, wherein the reference pixel value is a predetermined set value.

8. An apparatus for selecting output pixels from input pixels forming an input image, comprising:
- a memory; and
- a processor operatively coupled to the memory, functioning as:
- a determination unit configured to determine differences between pixel values of the input pixels and a reference pixel value, the reference pixel value based on a distribution of pixel values of the input image; and
- a selection unit configured to select the output pixels from the input pixels based on feature amounts representing features of the input pixels and the differences determined by said determination unit.

9. An apparatus for selecting output pixels from input pixels forming an input captured image, comprising:
- a memory; and
- a processor operatively coupled to the memory, functioning as:
- a determination unit configured to determine differences between pixel values of the input pixels and a reference pixel value, the reference pixel value based on an exposure value related to the input captured image; and
- a selection unit configured to select the output pixels from the input pixels based on feature amounts representing features of the input pixels and the differences determined by said determination unit.

10. The apparatus according to claim 1, wherein the processor further functions as a second determination unit configured to determine whether the input pixel is located at a corner, wherein the feature amount representing the feature of the input pixel is used by the second determination unit to determine whether the input pixel is located at the corner.

11. The apparatus according to claim 1, wherein the pixel values of the input pixels are expressed by luminance values.

12. The apparatus according to claim 1, wherein each of the pixel values of the input pixels and the reference pixel value has a value for each of a plurality of dimensions, and said determination unit determines the priorities of the input pixels based on the feature amounts of the input pixels and on differences between the pixel values of the input pixels and the reference pixel value of each of the plurality of dimension.

13. A selection method in a selection apparatus for selecting output pixels from input pixels forming an input image, the method comprising:
- determining priorities of the input pixels based on feature amounts representing features of the input pixels and on differences between the pixel values of the input pixels and the reference pixel value, wherein a higher priority is given to an input pixel having a smaller difference from the reference pixel value; and
- selecting the output pixels from the input pixels based on the determined priorities.

14. The method according to claim 13, wherein in the selecting the output pixel, a predetermined number of output pixels are selected from the input pixels based on the priorities.

15. The method according to claim 13, wherein in the selecting the output pixels, an input pixel having a small difference between the pixel values of the input pixels and the reference pixel value is preferentially selected.

16. The method according to claim 13, wherein in the selecting the output pixels, the output pixels a having smaller difference from the reference pixel value than the input pixels with a same feature amount are selected.

17. The method according to claim 13, further comprising matching a plurality of input images based on output pixels selected from input pixels forming the plurality of input images.

18. A non-transitory storage medium storing a computer program for selecting output pixels from input pixels forming an input image, the computer program comprising the steps of:
- determining priorities of the input pixels based on feature amounts representing features of the input pixels and on differences between the pixel values of the input pixels and the reference pixel value, wherein a higher priority is given to an input pixel having a smaller difference from the reference pixel value; and
- selecting the output pixels from the input pixels based on the determined priorities.

19. The non-transitory storage medium according to claim 18, wherein in the selecting the output pixels, a predetermined number of output pixels are selected from the input pixels based on the priorities.

* * * * *